(12) United States Patent
Gehlot et al.

(10) Patent No.: US 7,197,310 B2
(45) Date of Patent: Mar. 27, 2007

(54) METHODS AND SYSTEMS FOR CONTROLLING HANDOFFS IN A WIRELESS COMMUNICATION SYSTEM

(75) Inventors: Narayan L. Gehlot, Sayreville, NJ (US); Victor B. Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 444 days.

(21) Appl. No.: 10/628,231

(22) Filed: Jul. 29, 2003

(65) Prior Publication Data

US 2005/0026618 A1    Feb. 3, 2005

(51) Int. Cl.
  H04Q 7/20    (2006.01)
  H04Q 7/00    (2006.01)

(52) U.S. Cl. .................. 455/440; 455/436; 370/331

(58) Field of Classification Search ............... 455/440, 455/436; 370/331; 45/436
See application file for complete search history.

(56) References Cited

U.S. PATENT DOCUMENTS 5,572,221 A * 11/1996 Marlevi et al. ............. 342/452
6,011,971 A * 1/2000 Jolma ........................ 455/438
6,038,444 A * 3/2000 Schipper et al. ............ 455/421
6,047,191 A * 4/2000 Desgagne ................... 455/455
6,445,927 B1 * 9/2002 King et al. ............... 455/456.6
6,463,265 B1 * 10/2002 Cohen et al. ............. 455/186.1
6,522,888 B1 * 2/2003 Garceran et al. ......... 455/456.3
2002/0132628 A1 * 9/2002 Matsumoto et al. ........ 455/456

FOREIGN PATENT DOCUMENTS

EP    1081972 A2 *    3/2001

* cited by examiner

*Primary Examiner*—Lester G. Kincaid
*Assistant Examiner*—Marivelisse Santiago-Cordero

(57) ABSTRACT

Techniques for controlling handoffs in a wireless communication system include receiving a location vector from a mobile unit, and determining whether to perform a handoff of the mobile unit based on the received vector. The vector may also include time information related to the time at which the vector was transmitted. The vector may be obtained from a GPS satellite signal or one or more terrestrial stations.

26 Claims, 5 Drawing Sheets

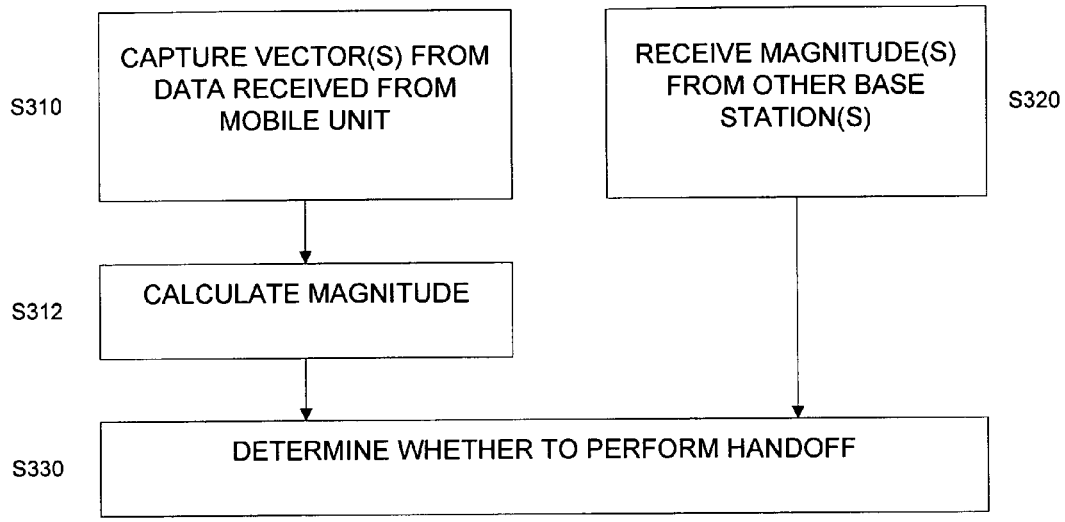
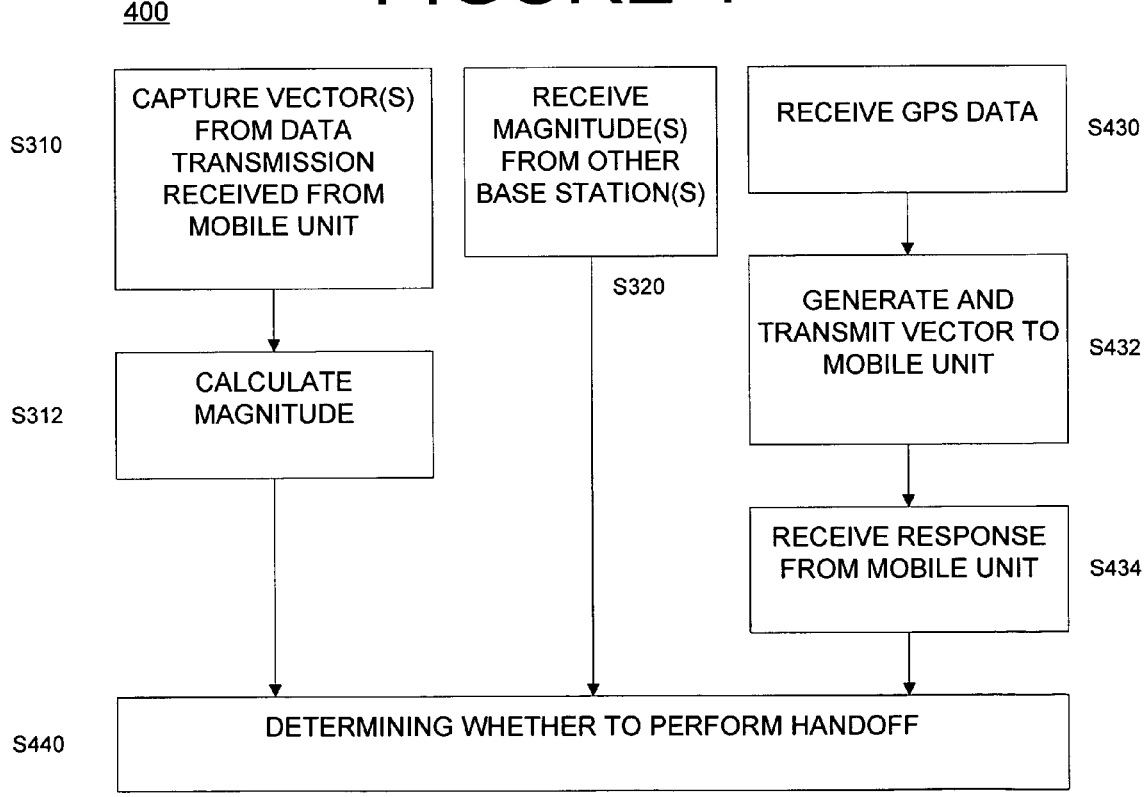

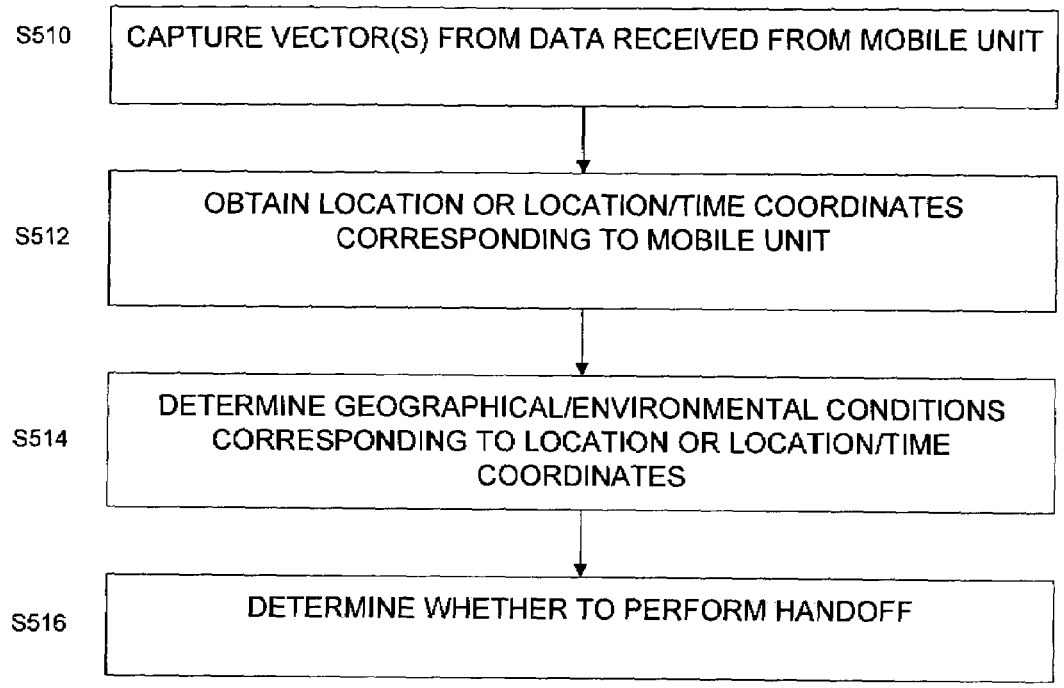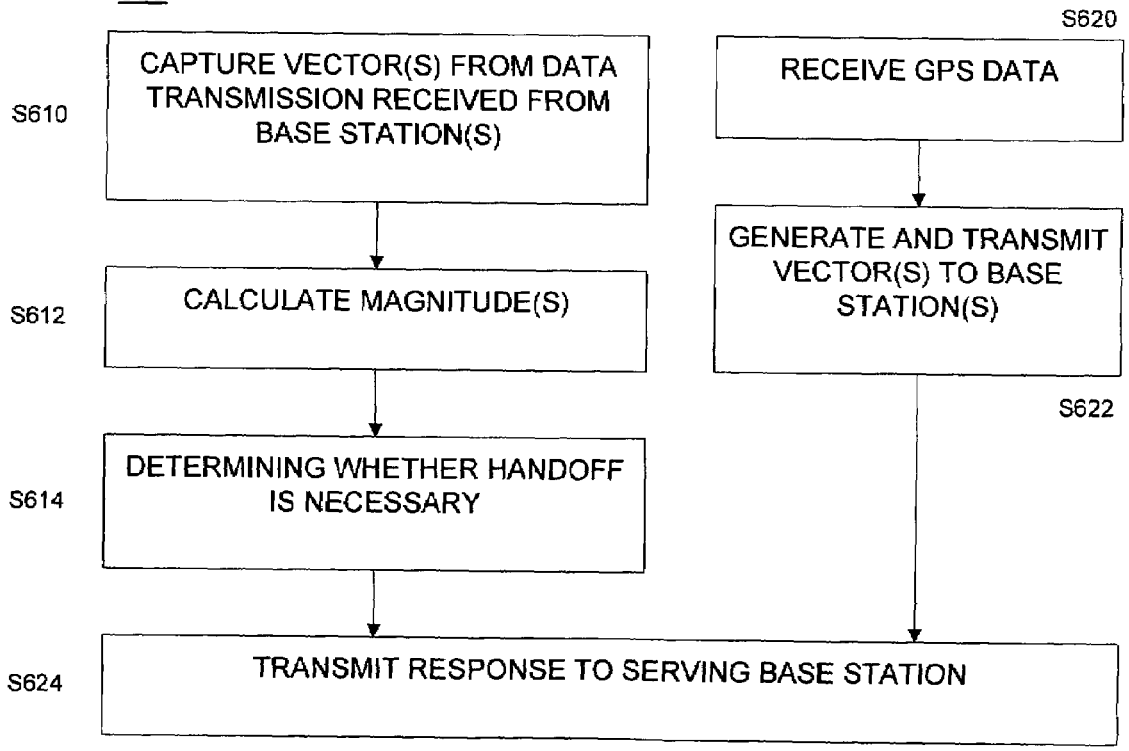

METHODS AND SYSTEMS FOR CONTROLLING HANDOFFS IN A WIRELESS COMMUNICATION SYSTEM

CROSS-REFERENCE TO RELATED APPLICATION

This application is related to U.S. patent application Ser. No. 10/079,755 filed on Feb. 19, 2002, by the same assignee, the contents of which are hereby incorporated by reference in its entirety, and to U.S. patent application Ser. No. 10/628,206, entitled METHODS AND DEVICES FOR SEAMLESSLY CHANGING PROTOCOLS IN A MOBILE UNIT filed concurrently herewith by the assignee, and having the same inventors, the contents of which are hereby incorporated by reference in its entirety.

BACKGROUND OF THE INVENTION

1. Field of the Invention

The present invention relates to wireless communication systems and, particularly, to methods and systems for controlling handoffs in a wireless communication system.

2. Description of the Related Art

Generally speaking, wireless communication systems operate by wirelessly transmitting voice or data signals between various base stations and mobile wireless devices, such as, for example, wireless telephones and Personal Digital Assistants (PDAs).

Wireless signals may be subjected to different geographical and environmental conditions that affect signal strength. For example, multipath propagation, where both an original signal and multiple reflections of that signal are received, can cause various problems, such as echoing and signal cancellation. The former results in deceptively high measurements of received signal power while the latter results in deceptively low measurements.

Environmental conditions such as rain, humidity, wind, and temperature may also affect the medium over which signals propagate from a transmitting device to a receiver, thus affecting signal quality.

In conventional wireless communication systems, base stations determine whether a mobile wireless device should be handed off from a "serving" base station to another base station based on signal strength measurements. However, due to the geographical and environmental conditions discussed above, the measured signal strength at each base station can be a deceptive indicator of service quality. For example, base station measurements may show an unrealistically high signal strength based on multipath reflections of previous signals being aggregated with currently received signals. Disadvantageously, such deceptive signal strength measurements can cause unnecessary handoffs, or cause the mobile device to be handed off to a suboptimal base station resulting in an increased rate of calls being dropped.

SUMMARY OF THE INVENTION

Problems associated with existing handoff techniques may be alleviated in accordance with the principles of the present invention by making a determination as to whether or not a handoff should be performed based on the location of a mobile unit, rather than rely on deceptive signal strength measurements only.

In one embodiment of the present invention, a device (e.g., base station) receives a location vector associated with a mobile device and determines whether a handoff should be performed based on the received vector. In a further embodiment, a base station may first transmit a location vector to a mobile unit and await a response from the mobile unit prior to completing a hand-off.

The location vector may be generated by a mobile device, base station or by a Global Positioning System (GPS) satellite (i.e., GPS signals).

In addition, a given vector may also include time information. In yet a further embodiment of the invention, this time information may be used to insure a handoff is carried out smoothly. This is made possible when the timing circuitry in a mobile unit and one or more base stations is synchronized together.

The present invention also allows handoff determinations to be made based on a mobile unit's path of motion, which is determined based on a series of location and time coordinates contained within a vector corresponding to the mobile unit.

BRIEF DESCRIPTION OF THE DRAWINGS

FIGS. 3–6 are flowcharts illustrating various techniques for controlling handoffs of a mobile unit according to exemplary embodiments of the present invention.

DETAILED DESCRIPTION OF EXEMPLARY EMBODIMENTS

Exemplary embodiments of the present invention are directed to techniques for controlling handoffs of a mobile unit in a wireless communication system (e.g., cellular system).

As used herein, the term "data" or "data transmission" includes, but it is not limited to, any voice or data signal capable of being transmitted between wireless devices, e.g., telephone voice signals, video/audio signals, fax signals, electronic computer files, or the like. Furthermore, the term "mobile unit" is used herein to refer to any type of wireless device being serviced in a wireless communication system, such devices include, without limitation, wireless telephones, laptops, PDAs, and the like.

According to an exemplary embodiment of the present invention, the wireless communication system includes one or more mobile units and base stations, each of which may be equipped with a Global Positioning System (GPS) receiver to receive and record location and time information (e.g., coordinates)(collectively referred to sometimes as "data" obtained from a GPS satellite or with another suitable receiver capable of receiving terrestrial location and time information.

Figure 1A:
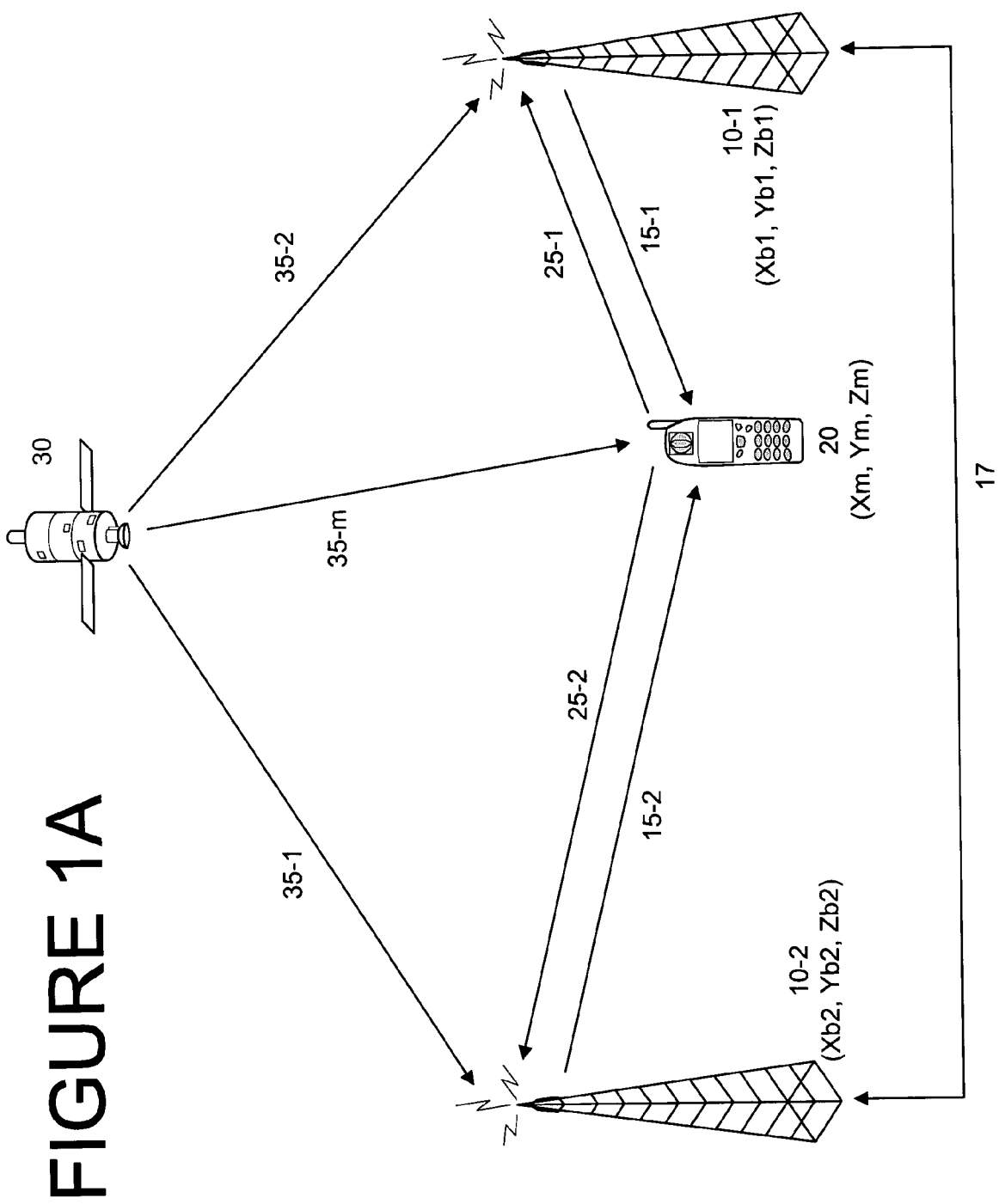
FIGS. 1A and 1B are schematic diagrams of elements in a wireless communications system according to exemplary embodiments of the present invention.

For example, FIG. 1A illustrates two base stations, 10-1 and 10-2, which receive and extract GPS data including location and time coordinates from data transmissions 35-1 and 35-2, respectively. As shown in FIG. 1A, mobile unit 20 similarly receives GPS data from data transmission 35-m.

Referring to FIG. 1A, the mobile unit 20 may generate and transmit a vector, which includes location information only or location and time information, to a serving base station 10-1 and another non-serving base station 10-2 using data transmissions 25-1 and 25-2, respectively. In addition, each of the base stations 10-1 and 10-2 may generate and transmit a vector, which includes its corresponding GPS location information or location and time information, to the mobile unit 20 using data transmissions 15-1 and 15-2, respectively. While FIG. 1A illustrates only one non-serving base station 10-2, the mobile unit 20 may transmit vectors to a plurality of non-serving base stations, which will be collectively referred to herein as "10-2." In addition, these vectors may comprise terrestrial signals generated using terrestrial transmission towers and triangulation or other techniques known in the art. To simplify the explanation which follows, however, the following discussion will focus on the use of GPS signals though it should be understood that a terrestrial signal may be substituted without departing from the spirit or scope of the present invention.

As used herein, the term "vector" refers to the set of location or location and time coordinates transmitted between wireless devices, and should not be construed as requiring a particular data format for combining these coordinates.

In an exemplary embodiment, the location coordinates of a vector may use a three dimensional (3D) coordinate system to represent a longitudinal position, a latitudinal position, and a relative height above sea level. In an exemplary embodiment, the coordinate system may be Cartesian, i.e., rectangular (x,y,z). However, it should be noted that the vector may use other known coordinate systems. For example, such coordinate systems include, but are not limited to, two-dimensional, cylindrical, and spherical systems. See for example, "Introduction to Modern Electromagnetics" by Carl H. Durney and Curtis C. Johnson (hereinafter "Durney and Johnson"), pp. 10–11, section 1.4, published by McGraw-Hill, Library of Congress Catalog Number 69-13605.

In addition to using a number of different coordinate systems, these vectors may be processed using a number of different techniques to generate various values associated with, or representative of, the vectors. See for example Durney and Johnson, pp. 39–65 (e.g., magnitude, vector gradient, divergence, curl, derivatives or integrals).

In an exemplary embodiment, each generated vector may include location coordinates directly obtained from the most recent received GPS data, or newly generated "pseudo" coordinates generated by incrementing the last location coordinates received from the GPS signal. For example, such pseudo coordinates may be used while there is a temporary absence of the GPS signal.

According to an exemplary embodiment, the location coordinates included in a vector may be representative of an area grid having a pre-defined granularity. For example, a Cartesian (x, y, z) grid may be assigned to a particular region (e.g., city or state), such that the coordinates are separated by a pre-defined distance (e.g., 5 meters). One of ordinary skill in the art will recognize that any regional or geographical area may be assigned such a grid.

In an exemplary embodiment, the time coordinates included in a vector may utilize a standardized time value, for example, Greenwich Mean Time (GMT). Furthermore, the time coordinates of the vectors may be obtained directly from the received GPS signal. In an alternative embodiment, the time coordinates of the vectors may comprise pseudo coordinates, which are generated by incrementing the coordinates received in the most recent GPS signal.

According to an exemplary embodiment, the time coordinate in a vector may correspond to time information generated by a Cesium clock aboard the GPS satellite 30. However, the present invention is not limited to using time information obtained from such a clock, or even time information obtained from a GPS signal. According to an alternative exemplary embodiment, the time information may be obtained from another independent source; for instance, time signals may be transmitted to the base stations 10-1, 10-2 and the mobile unit 20 from a remote location, which includes a clock or other timekeeping device.

For the purposes of illustration in connection with the following disclosure, a vector will be represented as including location coordinates x, y, and z or location co-ordinates x, y, and z, and a time coordinate t. However, this representation should not be construed as limiting the vectors of the present invention to any particular type of coordinate system or data format.

As shown in FIG. 1A, base stations 10-1 and 10-2 are situated at location corresponding to coordinates ($X_{b1}$, $Y_{b1}$, $Z_{b1}$) and ($X_{b2}$, $Y_{b2}$, $Z_{b2}$), respectively. FIG. 1A also shows mobile unit 20 as currently situated at a location ($X_m$, $Y_m$, $Z_m$). As described above, base stations 10-1 and 10-2 and mobile unit 20 may obtain their location coordinates (as well as their time coordinates) from the GPS signals transmitted by the GPS satellite 30 via data transmissions 35-1, 35-2, and 35-m, respectively.

As shown in FIG. 1A, mobile unit 20 transmits data (e.g., control signals, voice data, digital data, etc.) to base stations 10-1 and 10-2 using data transmissions 25-1 and 25-2, respectively. In FIG. 1A, base stations 10-1 and 10-2 each transmit data to the mobile unit 20 using data transmissions 15-1 and 15-2, respectively.

According to an exemplary embodiment, the mobile unit 20 may generate a vector to be transmitted to the base stations 10-1 and 10-2 using data transmissions 25-1 and 25-2. For example, the mobile unit 20 may utilize preamble bits, or any free bits, in a data packet being transmitted in data transmissions 25-1, 25-2. In an alternative embodiment, the vector may be transmitted using a separate pilot tone, or using a separate channel superimposed on the basic signal channel used in data transmissions 25-1, 25-2.

Similarly, each base station 10-1, 10-2 can similarly use data packet bits, a separate pilot tone, or a different channel superimposed on the signal channel to transmits its vector to the mobile unit 20.

As shown in FIG. 1A, the base stations 10-1 and 10-2 communicate via pathway 17. Pathway 17 may either be a wireline connection, or a wireless communication pathway between the base stations 10-1 and 10-2. Such a communication pathway 17 can be used by the base stations 10-1 and 10-2 to exchange information, e.g., for determining which base station 10-1 or 10-2 is the best to serve the mobile unit 20. The communication pathway 17 can also be used to communicate other data, which is used to effectuate the handoff of a mobile unit 20 between the base stations 10-1 and 10-2.

In an exemplary embodiment of the present invention, a base station 10-1, 10-2 of the wireless communication system may be stationary. For instance, the base stations 10-1 and 10-2 of FIG. 1A may be fixed at their respective locations of ($X_{b1}$, $Y_{b1}$, $Z_{b1}$) and ($X_{b2}$, $Y_{b2}$, $Z_{b2}$). Accordingly, the mobile unit 20 will be able to identify each base station 10-1 and 10-2 according to the location coordinates extracted from the vector transmitted by the corresponding base station.

However, in an alternative embodiment, the wireless system may include base stations 10-1, 10-2 that are not stationary. In military applications, for instance, wireless communications can be facilitated in the field through the use of base station towers (antennas) carried on the back of trucks.

Figure 1B:
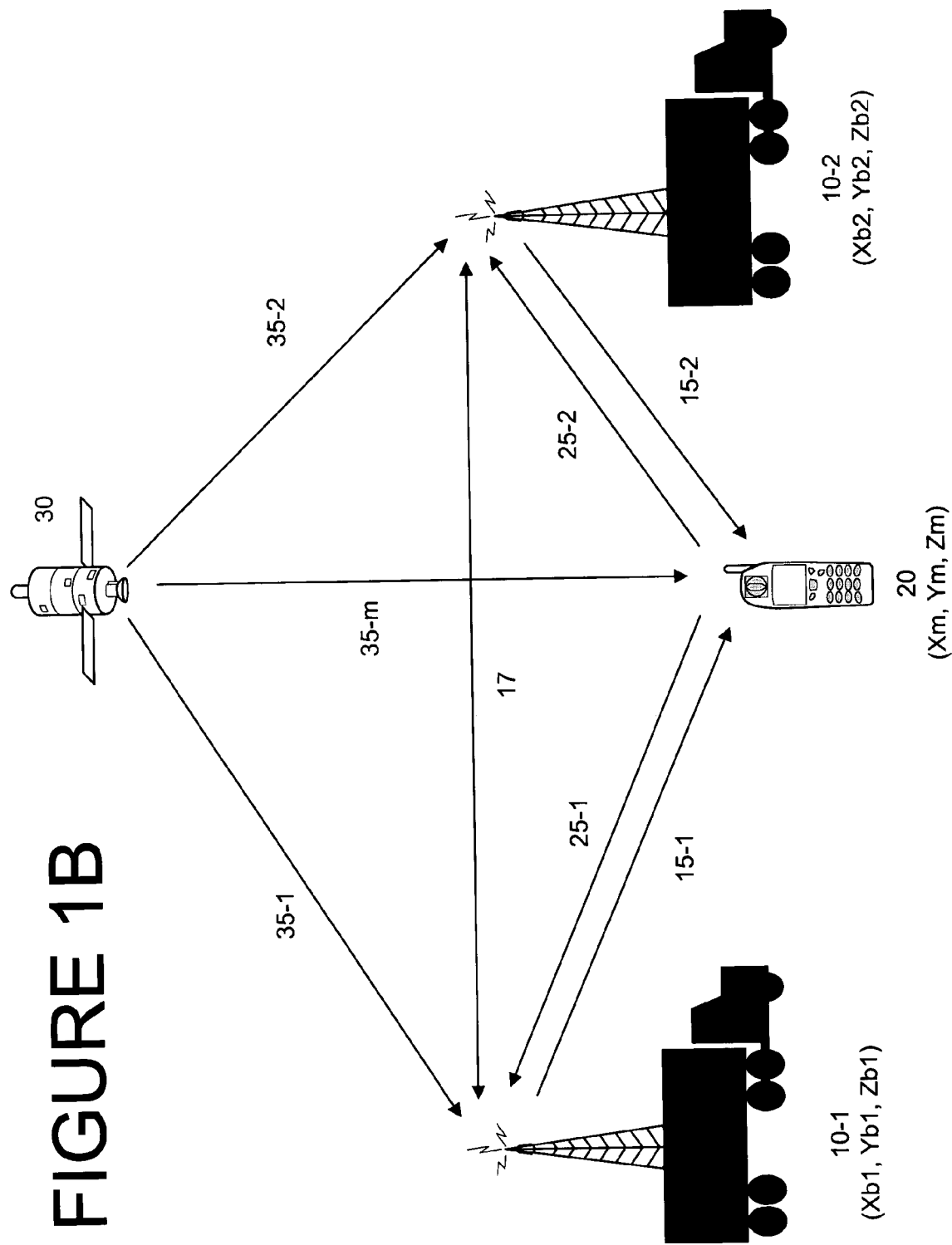

FIG. 1B is a schematic diagram, which differs from FIG. 1A in that it illustrates non-stationary base stations 10-1 and 10-2. As shown in FIG. 1B, the base stations 10-1 and 10-2 may communicate with one another via a communication pathway 17 for wireless data transmissions.

When non-stationary base stations 10-1, 10-2 are transmitting vectors to the mobile unit 20, there should be some means for the mobile unit to distinguish the base station 10 transmitting a particular vector.

Thus, in an exemplary embodiment in which non-stationary base stations are used in the wireless system, each base station 10 may include "identity information" in each vector it transmits to the mobile unit 20. Such identity information uniquely identifies the transmitting base station 10 to the mobile unit 20 receiving the vector. Alternatively, each base station 10-1, 10-2 may be configured to transmit vectors to the mobile unit 20 using a different carrier frequency, thus allowing the mobile unit 20 to determine which base station transmitted each vector it receives.

According to another exemplary embodiment, the vectors transmitted between the base stations 10-1, 10-2 and the mobile unit 20 can be used to initiate and control handoffs of the mobile unit 20 from a serving base station. A technique of controlling the handoff of a mobile unit 20 will be described below with respect to FIGS. 2–6.

FIGS. 3–5 are flowcharts each illustrating a technique for controlling the handoff of a mobile unit 20 according to an exemplary embodiment. Each of the methods illustrated in these figures may be performed at a serving base station or another base station.

However, the present invention should not be construed as thus limited. In other exemplary embodiments, each of these methods, or portions thereof, may be performed in other components, e.g., a Mobile Switching Center (MSC), or other subsystems of a wireless communication system as will be contemplated by those ordinarily skilled in the art. For purposes of illustration, however, the steps in FIGS. 3–5 will be described below as being performed in a serving base station 10-1.

FIG. 3 is a flowchart illustrating a process 300 by which a serving base station 10-1 controls the handoff of a mobile unit 20 according to an exemplary embodiment of the present invention.

In step S310, the serving base station 10-1 receives and extracts one or more vectors $(X_m, Y_m, Z_m)$ or $(X_m, Y_m, Z_m, T_m)$ received in data transmissions from the mobile unit 20. Location and time coordinates $X_m, Y_m, Z_m,$ and $T_m$ in the received vector corresponds to the location and time at which the mobile unit 20 transmitted the corresponding data transmission.

In step S312, the serving base station 10-1 calculates a magnitude corresponding to its coverage area based on the received vector(s). The magnitude helps determine whether the mobile unit 20 is within the coverage area of the base station 10-1. In other words, the magnitude is used to determine whether the serving base station 10-1 is the best one to serve the mobile unit 20.

In an exemplary embodiment, the base station 10-1 generates a vector $(X_b, Y_b, Z_b)$ or $(X_b, Y_b, Z_b, T_b)$ when it receives each corresponding vector $(X_m, Y_m, Z_m)$ or $(X_b, Y_b, Z_b, T_b)$ from the mobile unit 20. The generated vector thus indicates the location or the location and the time at which the base station 10-1 received the corresponding vector from the mobile unit 20.

For instance, for each received vector $(X_m, Y_m, Z_m, T_m)$, and the corresponding generated time-space vector $(X_b, Y_b, Z_b, T_b)$, the base station 10-1 can determine both a propagation distance $\|(X_m, Y_m, Z_m)-(X_b, Y_b, Z_b)\|$ and a propagation time $T_b-T_m$ for signals transmitted from the mobile unit 20.

In an exemplary embodiment, the base station 10-1 may calculate the magnitude of a received vector using either the determined propagation distance, propagation time, a combination of both, or using any other parameters as will be readily apparent to those skilled in the art. Furthermore, vector magnitudes may be calculated using the parameters associated with other coordinate systems (as discussed, e.g., in the above-cited portions of Durney and Johnson).

Furthermore, the base station 10-1 may calculate a single magnitude using multiple vectors received from the mobile unit 20. For instance, the base station can combine the magnitudes calculated for a plurality of received vectors into one magnitude, e.g., by averaging together the calculated magnitudes. This combined magnitude may then be used as the calculated magnitude for the serving base station 10-1. In such an embodiment, the base station 10-1 may examine the time coordinate $T_m$ of each received vector, and then use only that group of vectors that were transmitted within a particular time of one another.

However, the present invention is not limited to calculating a magnitude using only the location and/or time information in the received vectors to compare base stations 10-1 and 10-2. For example, the serving base station 10-1 may utilize other vector manipulations. Such manipulations may include, but are not limited to, vector gradient, divergence, curl, derivatives, integration, and other such manipulations as, for example, discussed in Durney and Johnson (pp. 39–65).

Also, the comparison and selection of a best base station 10-1 or 10-2 may be performed using other conventional parameters, such as a measured signal strength corresponding to the mobile unit 20, a measured interference level of the base station's coverage area, etc. Such parameters may also be combined with a calculated magnitude, or other vector manipulation, in any manner as will be contemplated by those of ordinary skill in the art.

In a further exemplary embodiment, while the serving base station 10-1 is performing steps S310 and S312, it may also receive magnitudes corresponding to the coverage areas of other base stations 10-2, e.g., via communication pathway (s) 17. For example, the mobile unit 20 may transmit a vector to a plurality of different base stations 10-1 and 10-2 in the wireless system. Each non-serving base station 10-2 receiving a vector from the mobile unit 20 can calculate its own magnitude, in a manner similar to that described above in connection with step S212. These base stations 10-2 may then transmit their corresponding magnitudes to the serving base station 10-1.

In step S330, the serving base station 10-1 determines whether to perform a handoff of the mobile unit 20 to another base station 10-2 based on the calculated magnitude and the received magnitudes. In an exemplary embodiment, the serving base station 10-1 may determine a best base station 10-1 or 10-2 for serving the mobile unit 20 by comparing the calculated magnitude and the received magnitudes to one another. For instance, assume each magnitude is calculated as the propagation distance between the mobile unit 20 and a respective base station 10-1, 10-2. In such an example, the best base station 10-1 or 10-2 may be determined as the closest one to the mobile unit 20, i.e., the base station 10-1 or 10-2 whose propagation distance to the mobile unit 20 is smallest (i.e., whose magnitude is smallest).

Alternatively, the magnitudes may be calculated as propagation times for signals communicated between the base station 10-1, 10-2 and the mobile unit 20. Thus, the best base station 10-1 or 10-2 may be determined as the one whose propagation time is the smallest (i.e. whose magnitude is smallest).

According to an exemplary embodiment, if the serving base station 10-1 determines that another base station 10-2 is the best, e.g., based on a comparison of magnitudes, then the serving base station may decide to perform the handoff to the best base station 10-2 and initiate a handoff of the mobile unit 20 to the best non-serving base station 10-2.

In a further exemplary embodiments, the serving base station 10-1 may consider other criteria for determining whether to perform the handoff in step S330. For example, the serving base station 10-1 may be able to detect a multipath propagation condition within its coverage area if it receives two or more identical vectors (i.e., having identical location coordinates $X_m$, $Y_m$, $Z_m$, and time coordinates $T_m$) from the mobile unit 20 at different times (i.e., corresponding to different values of $T_b$). The serving base station 10-1 may then determine that a handoff is necessary, even though the serving base station 10-1 has the best corresponding magnitude.

Furthermore, the present invention should not be limited to embodiments in which the serving base station 10-1 compares its calculated magnitude with magnitudes corresponding to other base stations 10-2. In an alternative embodiment, in step S320 it may be determined whether a handoff is necessary by comparing a calculated magnitude to a threshold magnitude. For example, if a propagation distance of a vector received from a mobile unit 20 is larger than a predetermined threshold, the serving base station 10-1 may determine that a handoff is required, and initiate procedures to handoff the mobile unit to a nearby base station 10-2.

In an additional exemplary embodiment, the mobile unit 20 may also participate in selecting the best base station and determining whether the handoff should be performed. For example, conditions in certain regions serviced by a wireless system may be such that signal propagation from the mobile unit 20 to a base station 10-1 or 10-2 is much better than from the base station 10-1 or 10-2 to the mobile unit 20 (or vice versa).

FIG. 4 is a flowchart illustrating a process 400 in which a mobile unit 20 participates in controlling a handoff, according to an exemplary embodiment of the present invention.

With respect to FIGS. 3 and 4, like steps are referred to using the same reference numerals. Accordingly, steps S310, S312, and S320 in FIG. 4 are performed similarly to the similarly labeled steps in FIG. 3; thus, a description of these steps will not be repeated.

While the serving base station 10-1 is performing steps S310 and S312 to calculate the magnitudes, it may also perform another sequence of steps, including steps S430, S432, and S434. In step S430, the serving base station 10-1 may receive GPS data from the GPS satellite 30. Based on the received GPS data, the serving base station 10-1 may generate and transmit a vector to the mobile unit 20, according to step S432.

In step S434, the serving base station 10-1 may then receive a data transmission from the mobile unit 20 in response to the transmitted vector. The response received from the mobile unit 20 may indicate a determination by the mobile unit 20 as to which of the base stations 10-1, 10-2 is best. Alternatively, the response may merely indicate a preference by the mobile unit 20 as to whether or not it should be handed-off to another base station 10-2.

In another embodiment, the response message may include one or more magnitudes calculated by the mobile unit 20 based on the vectors received from one or more non-serving base stations 10-2.

A technique by which the mobile unit 20 can generate a response message according to an exemplary embodiment is described in more detail below with respect to FIG. 6.

Continuing, in step S440, the serving base station 10-1 determines whether to perform the handoff based on the response received from the mobile unit 20. For example, the serving base station 10-1 may allow the mobile unit 20 to either allow or refuse a handoff to a particular base station 10-2. Alternatively, if the response message contains one or more magnitudes corresponding to the non-serving base stations 10-2, step S440 may use these magnitudes in the determination of which base station 10-1, 10-2 is best.

While FIG. 4 shows the serving base station 10-1 making its determination based on its own magnitude and magnitudes received from other base stations 10-2, the exemplary embodiment of FIG. 4 is not so limited. For example, only those responses received from the mobile unit 20 may be used to determine whether a handoff will be performed, and which base station 10-2 will receive the handoff.

According to another exemplary embodiment of the present invention, the serving base station 10-1 may determine whether to perform a handoff of the mobile unit 20 based on service quality data corresponding to its coverage area. For example, the types of service quality data considered by a base station 10-1 or 10-2 may include one or more geographical and/or environmental conditions that affect service quality.

For example, base stations 10-1, 10-2 in a wireless system may maintain a database of geographical and environmental conditions. Using this database, the base station 10-1 or 10-2 can determine the existence of such conditions within the surrounding region that can potentially affect the base station's service to the mobile unit 20.

The database of a base station 10-1 or 10-2 may include known geographical obstacles (e.g., hills, buildings, wooded areas) that may cause multipath reflections of a transmitted signal. Geographical obstacles may be indexed in the database according to their location within a region surrounding the base station. Generally, these types of geographical conditions remain relatively static for a corresponding region, and thus do not require frequent updating in the database.

A base station 10-1 or 10-2 may also maintain a database of environmental conditions, including, e.g., an average temperature, an average amount of wind gust or rainfall, previous service quality (as measured, e.g., by call drop rate), or other such conditions. Such data may be indexed according to specific locations within the surrounding region, and/or by time information (e.g., seasons or months of the year).

The database may also include environmental conditions (e.g., weather conditions) forecast to occur at a specific time. Such a database may be updated more frequently. For example, they may be updated by devices that measure current weather or other environmental conditions in the corresponding region. An example of such a device is a rain detector. In an alternative embodiment, the base station 10-1 or 10-2 can simply send a request to these measuring devices to obtain real time measurements of environmental conditions.

According to yet another exemplary embodiment, the serving base station 10-1 may obtain information as to the mobile unit's 20 location and path of motion. The serving base station 10-1 may use this information to predict whether the mobile unit 20 is approaching a geographical obstacle or environmental condition, which may adversely affect service quality or cause the mobile unit 20 to drop a call.

Figure 2:
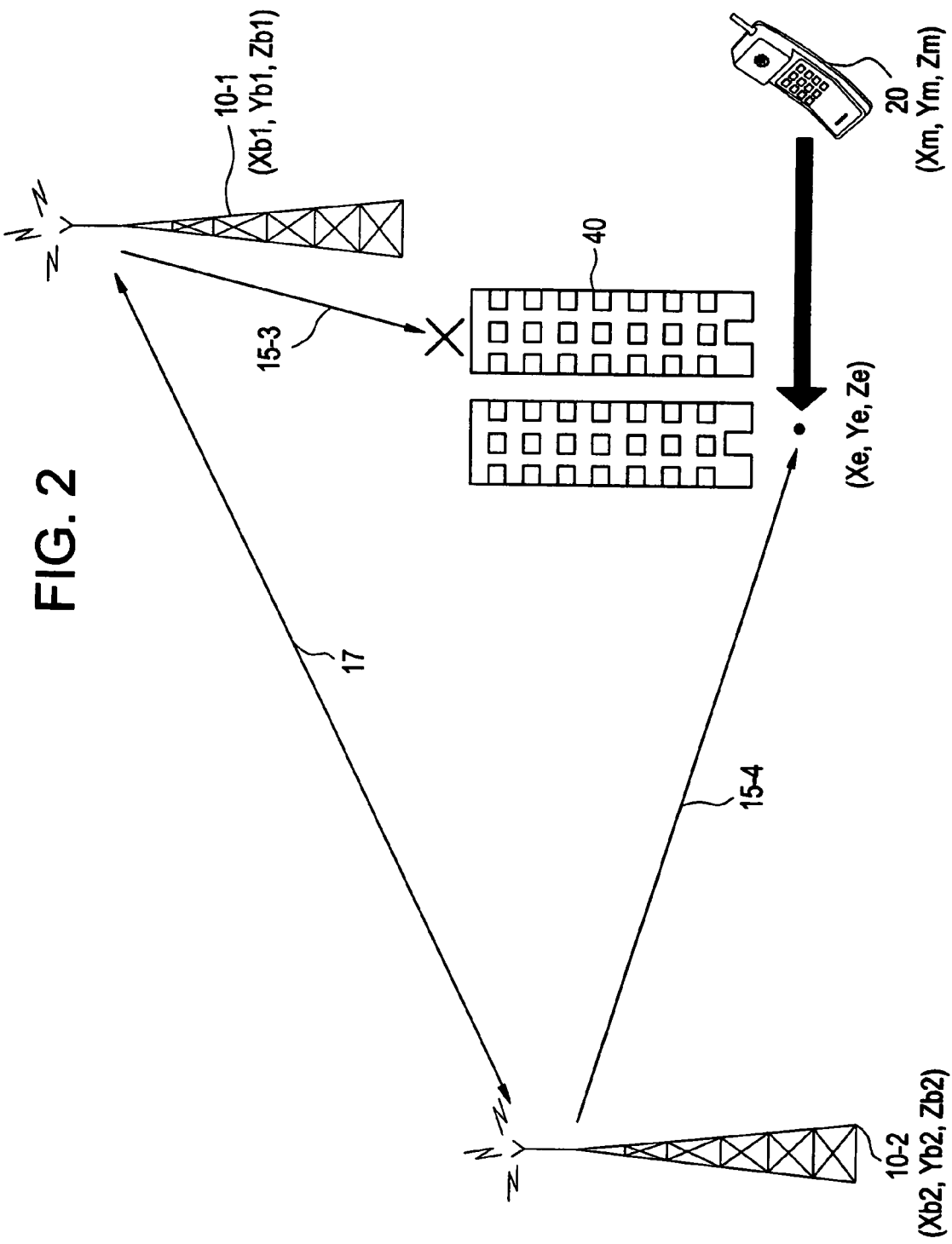
FIG. 2 illustrates a situation where a mobile unit's location and path of motion can be used to control handoffs according to an exemplary embodiment of the present invention.

FIG. 2 illustrates a situation where a mobile unit's location and path of motion can be used to control handoffs according to an exemplary embodiment of the present invention. FIG. 2 shows a mobile unit 20 currently located at $(X_m, Y_m, Z_m)$, which is being served by base station 10-1. Based on the mobile unit's path of motion, it can be determined that the mobile unit 20 is approaching an estimated location $(X_e, Y_e, Z_e)$. It can also be determined that buildings 40 will act as a geographical obstacle at this estimated location $(X_e, Y_e, Z_e)$ for a pathway of data transmissions 15-3 from the serving base station 10-1. However, a pathway for data transmissions 15-4 from base station 10-2 will not be affected by buildings 40 when the mobile unit 20 reaches location $(X_e, Y_e, Z_e)$. Thus, in an exemplary embodiment, the serving base station 10-1 performs a handoff of the mobile unit 20 to base station 10-2.

According to an exemplary embodiment, the mobile unit's 20 path of motion, as well as its speed along this path, can be estimated based on a series of vectors generated by the mobile unit 20. Using the estimated path of motion and speed, the mobile unit's future location and time coordinates can be estimated. Such estimations can be made by the mobile unit 20 according to an exemplary embodiment. In an alternative embodiment, the serving base station 10-1 may estimate the future location and time coordinates based on vectors it receives from the mobile unit 20.

A user of a mobile unit 20 may travel along the same path on a regular basis, e.g., by taking the same route to and from work, at roughly the same time each day. Thus, in an alternative embodiment, the serving base station 10-1 may determine the estimated future location and time coordinates of a mobile unit 20 based on stored data (e.g., in a database).

FIG. 5 is a flowchart illustrating a technique 500 by which a serving base station 10 considers environmental and geographical conditions in controlling a handoff according to an exemplary embodiment of the present invention.

In step S510, the serving base station 10 receives and extracts one or more vectors from the mobile unit 20. In an exemplary embodiment, the base station 10 may generate a time coordinate $T_b$ corresponding to the time at which it receives each vector from the mobile unit 20.

In step S512, the serving base station 10-1 may obtain location and time coordinates corresponding to the mobile unit 20. In an exemplary embodiment, this step may only involve extracting the location and time coordinates $X_m, Y_m, Z_m, T_m$ from a received vector.

However, in another exemplary embodiment, the base station 10-1 may obtain estimated future location and time coordinates for the mobile unit 20 in step S512. As described above, the base station 10-1 may estimate the future location and time coordinates based on either a plurality of received vectors, or a predetermined path of motion.

According to step S514, the serving base station 10-1 uses the location and time coordinates obtained in step S512 to obtain service quality data, e.g., any geographical and/or environmental conditions in the surrounding region affecting service quality for the mobile unit 20.

As noted above, the service quality data can be obtained by performing a database lookup using the obtained location and/or time coordinates. The serving base station 10-1 can use either the current location coordinates, or estimated future coordinates, to determine whether the mobile unit 20 is in, or will be in, the vicinity of geographical obstacles (e.g., tall buildings) that might block data transmissions or cause multipath propagation of signals.

The serving base station 10-1 can also use location and time coordinates to determine environmental conditions, for example, rain, wind, humidity, etc., which may affect data transmissions to and from the mobile unit 20. For example, the serving base station 10-1 may use estimated future location and time coordinates to obtain, from its database, weather conditions forecasted to occur at the same region and time at which the mobile unit 20 is estimated to arrive.

At step S516, the serving base station 10-1 uses the determined geographical and environmental conditions to determine whether a handoff of the mobile unit 20 should be performed. For instance, the serving base station 10-1 may make the determination to initiate a handoff based on the existence of such geographical and/or environmental conditions alone.

Alternatively, the serving base station 10-1 may consider each determined geographical and environmental condition as but one factor to be weighed against other factors, (e.g., the location of nearby base stations 10, a comparison of magnitudes associated with the base stations 10, etc.). In an exemplary embodiment, the technique 500 described in FIG. 5 may be used in conjunction with either of the techniques described above with respect to FIGS. 3 and 4 to control the handoff.

As mentioned above, the mobile unit 20 can participate in the determination of whether a handoff should be performed, and to which base station 10-2 such handoffs should be made. FIG. 6 illustrates a technique 600 by which a mobile unit 20 participates in controlling handoffs according to an exemplary embodiment.

In FIG. S610, the mobile unit 20 can receive one or more vectors from data transmissions received from the serving base station 10-1 and/or other base stations 10-2 in the wireless system.

In an embodiment where the base stations 10-1, 10-2 are stationary, the mobile unit 20 may be able to identify the base station 10-1 or 10-2 sending each vector based on the corresponding location coordinates $X_b, Y_b, Z_b$.

However, if one or more of the base stations 10-1, 10-2 are non-stationary, the mobile unit 20 may be required to use identity information (e.g., a unique base station identifier) in the vector to identify the base station 10-1 or 10-2 corresponding to the vector. Alternatively, the mobile unit 20 may be able to distinguish the base station 10-1 or 10-2, which sent a vector, according to the carrier frequency over which the vector was received.

According to step S612, the mobile unit 20 may then calculate a magnitude corresponding to each base station 10-1, 10-2 from which one or more vectors are received. The mobile unit 20 may perform steps S610 and S612 similar to the manner in which the serving base station 10 performs steps S310 and S312, as described above in connection with FIGS. 3 and 4.

The mobile unit 20 may then make its own determination of whether a handoff is necessary in step S614. For example, the mobile unit 20 may use the calculated magnitudes to determine a best base station 10-1 or 10-2, and generate a response message for the serving base station 10-1 indicating this selection. In this example, the best base station would represent the base station 10-1 or 10-2 to which the mobile unit 20 would prefer to be handed off. Alternatively, the mobile unit 20 may respond to the serving base station 10-1 by indicating whether it agrees to, or desires to be, handed-off to another base station 10-2.

In an alternative embodiment, the mobile unit 20 may be configured to generate a response for each base station 10-1, 10-2 transmitting a vector. For example, the mobile unit 20 may calculate the magnitude based on the vector(s) received from a particular base station 10-1 or 10-2, and include the calculated magnitude in a response to that base station 10-1 or 10-2.

In an exemplary embodiment, the mobile unit, in steps S620 and S622, may obtain GPS data, and generate vectors to be transmitted to base stations 10-1 and 10-2 in the wireless system 10. Accordingly, each non-serving base station 10-2 receiving one or more of these vectors can calculate its own magnitude, and, for example, send the calculated magnitude to the serving base station 10-1 via communication pathway 17.

However, in an alternative embodiment, the mobile unit 20 need not perform steps S620 and S622. For example, the mobile unit 20 may alone make the actual determination of whether the handoff is necessary (and, e.g., which base station 10-1 or 10-2 should receive the handoff), and indicate this determination to the serving base station 10-1. Still further, the serving base station 10-1 may allow the mobile unit 20 to determine whether the handoff is necessary, and consider this determination along with other factors, i.e., geographical and environmental conditions.

In step S624, the mobile unit 20 transmits its response message to the serving base station 10-1. As discussed above, the mobile unit 20 may also, or as an alternative, transmit response messages to the other base stations 10-2 based on the received vectors.

Exemplary embodiments of the present invention being thus described, it will be obvious that these embodiments may be varied in many ways. Such variations are not to be regarded as a departure from the spirit and scope of the invention. All such modifications as would be readily apparent to those skilled in the art are intended to be included within the scope of the following claims.

What is claimed is:

1. A method for controlling handoffs in a wireless communication system, comprising the steps of:
    receiving a plurality of vectors associated with a mobile unit;
    detecting multipath propagation when at least two of the plurality of received vectors include identical location and time coordinates;
    performing a handoff when multipath propagation is detected, wherein each vector comprises three dimensional terrestrial data; and further comprising the steps of:
    calculating a magnitude of each of the plurality of received vectors;
    combining the calculated magnitudes into a combined magnitude; and
    determining whether the handoff is necessary based on the combined magnitude.

2. The method of claim 1, further comprising the steps of: transmitting each vector to the mobile unit, and receiving a response from the mobile unit based on the transmitted vectors.

3. The method of claim 1, wherein each vector comprises Global Positioning System (GPS) data.

4. The method of claim 1 further comprising the step of:
    receiving one or more magnitudes from one or more base stations;
    comparing the combined magnitude to the received magnitudes; and determining that a handoff is necessary when one of the received magnitudes is less than the combined magnitude.

5. The method of claim 1 further comprising the steps of: obtaining service quality data based on each received vector, wherein the service quality data includes at least one of an environmental and geographical condition related to a coverage area of a base station: and determining whether to perform the handoff based on the service quality data.

6. The method of claim 5, wherein the obtaining step further comprises the steps of: extracting at least one of a location and time coordinate from each received vector; and retrieving the service quality data from a database based on the extracted information.

7. The method of claim 6, wherein the retrieving step further comprises the step of: retrieving a geographical condition from the database based on location coordinates extracted from each received vector, the retrieved geographical condition including at least one of: topographical data, structural data, and known reflection path.

8. The method of claim 6, wherein the retrieving step further comprises the step of: retrieving an environmental condition from the database based on time information extracted from each received vector, the environmental condition selected from the group consisting of at least: rain, wind, temperature and humidity.

9. The method of claim 1, further comprising the steps of: estimating future location coordinates for the mobile unit based on the plurality of received vectors; and retrieving a geographical condition from a database based on the estimated future location coordinates.

10. The method as in claim 1 further comprising the step of generating each vector at the mobile unit.

11. The method as in claim 1 further comprising the step of generating each vector at a base station.

12. The method as in claim 1 further comprising generating each vector at a GPS satellite.

13. A device for controlling handoffs in a wireless communication system, comprising:
    means for a plurality of vectors associated with a mobile unit;
    means for detecting multipath propagation when at least two of the plurality of received vectors include identical location and time coordinates; and
    means for performing the handoff when multipath propagation is detected, wherein each vector comprises three dimensional terrestrial data; and further comprising
    means for calculating a magnitude of each of received vector;
    means for receiving one or more magnitudes corresponding to coverage areas of one or more base stations;
    means for comparing the calculated magnitudes to the received magnitudes; and
    means for determining whether that the handoff is necessary when one of the received magnitudes is less than the calculated magnitude.

14. The device of claim 13, further comprising: means for transmitting each vector to the mobile unit, and means for receiving a response from the mobile unit based on the transmitted vectors.

15. The device of claim 13, wherein each vector comprises Global Positioning System (GPS) data.

16. The device of claim 13, further comprising:
means for combining the calculated magnitudes into a combined magnitude; and
means for determining whether the handoff is necessary based on the combined magnitude.

17. The device of claim 16, further comprising: means for receiving one or more magnitudes from one or more other base stations; means for comparing the combined magnitude to the received magnitudes; and means for determining that a handoff is necessary when one of the received magnitudes is less than the combined magnitude.

18. The device of claim 13, further comprising means for obtaining service quality data based on each received vector, wherein the service quality data includes at least one of an environmental and geographical condition related to a coverage area of a base station, and means for determining whether to perform the handoff based on the service quality data.

19. The device of claim 18, further comprising means for extracting at least one of a location and time coordinate from each received vector and means for retrieving the service quality data from a database based on the extracted information.

20. The device of claim 19, wherein the means for retrieving further comprises means for retrieving a geographical condition from the database based on location coordinates extracted from each received vector, the retrieved geographical condition including at least one of: topographical data, structural data, and known reflection path.

21. The device of claim 19, wherein the means for retrieving further comprises means for retrieving an environmental condition from the database based on time information extracted from each received vector, the environmental condition selected from the group consisting of at least: rain, wind, temperature and humidity.

22. The device of claim 13, further comprising:
means for estimating future location coordinates for the mobile unit based on the plurality of received vectors; and
means for retrieving a geographical condition from a database based on the estimated future location coordinates.

23. The device of claim 13, wherein each received vector further comprises time information.

24. The device as in claim 13 further comprising means for generating each vector at the mobile unit.

25. The device as in claim 13 further comprising means for generating each vector at a base station.

26. The method as in claim 13 further comprising means for generating each vector at a GPS satellite.

* * * * *